Figure 1:
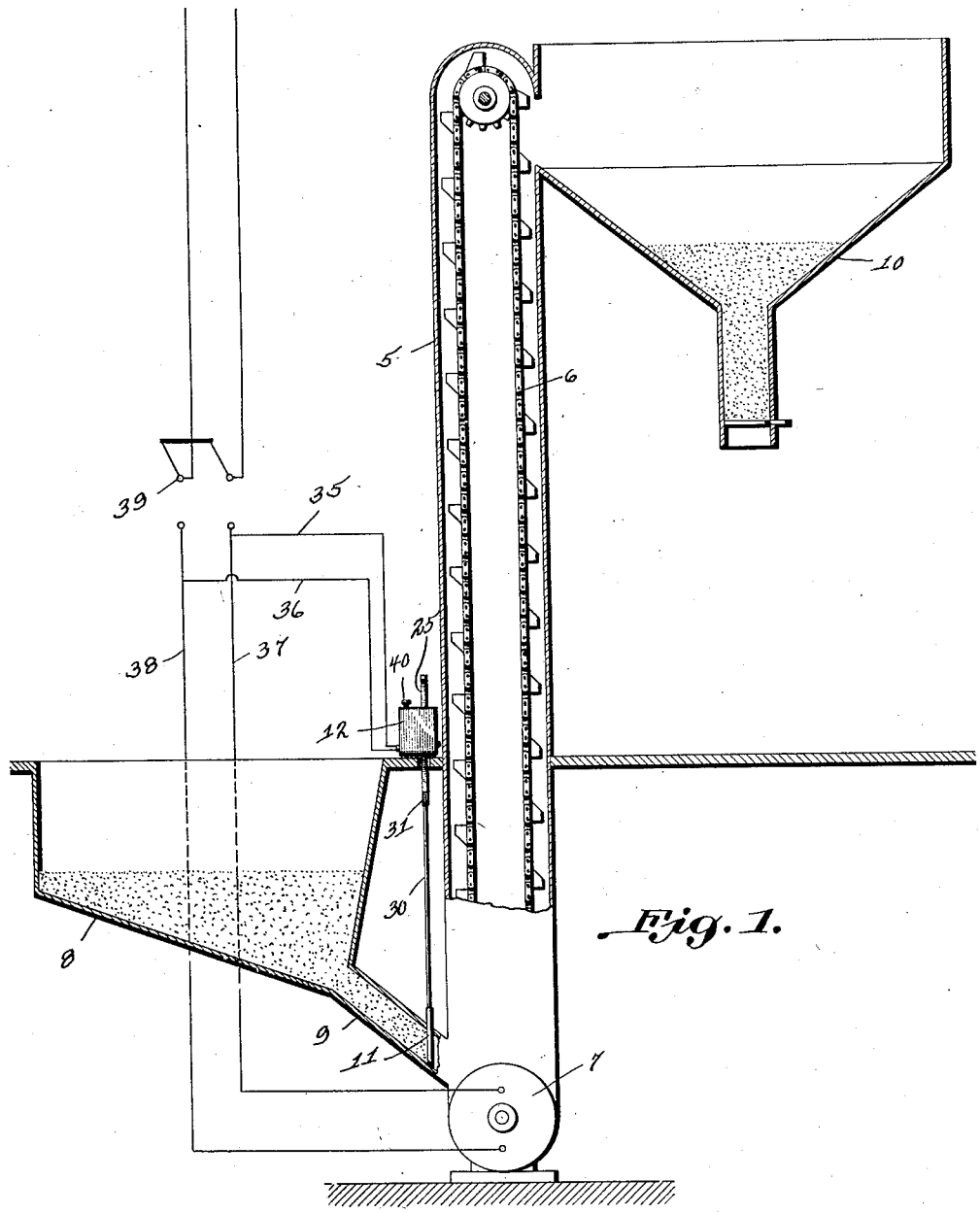

Jan. 26, 1932.  H. R. SIMMONS  1,842,919
AUTOMATIC RELEASE ATTACHMENT FOR SLIDING GRAIN CUT-OFF
Filed May 28, 1930  3 Sheets-Sheet 1

H. R. Simmons, Inventor

By W. E. Beck Jr.
Attorney

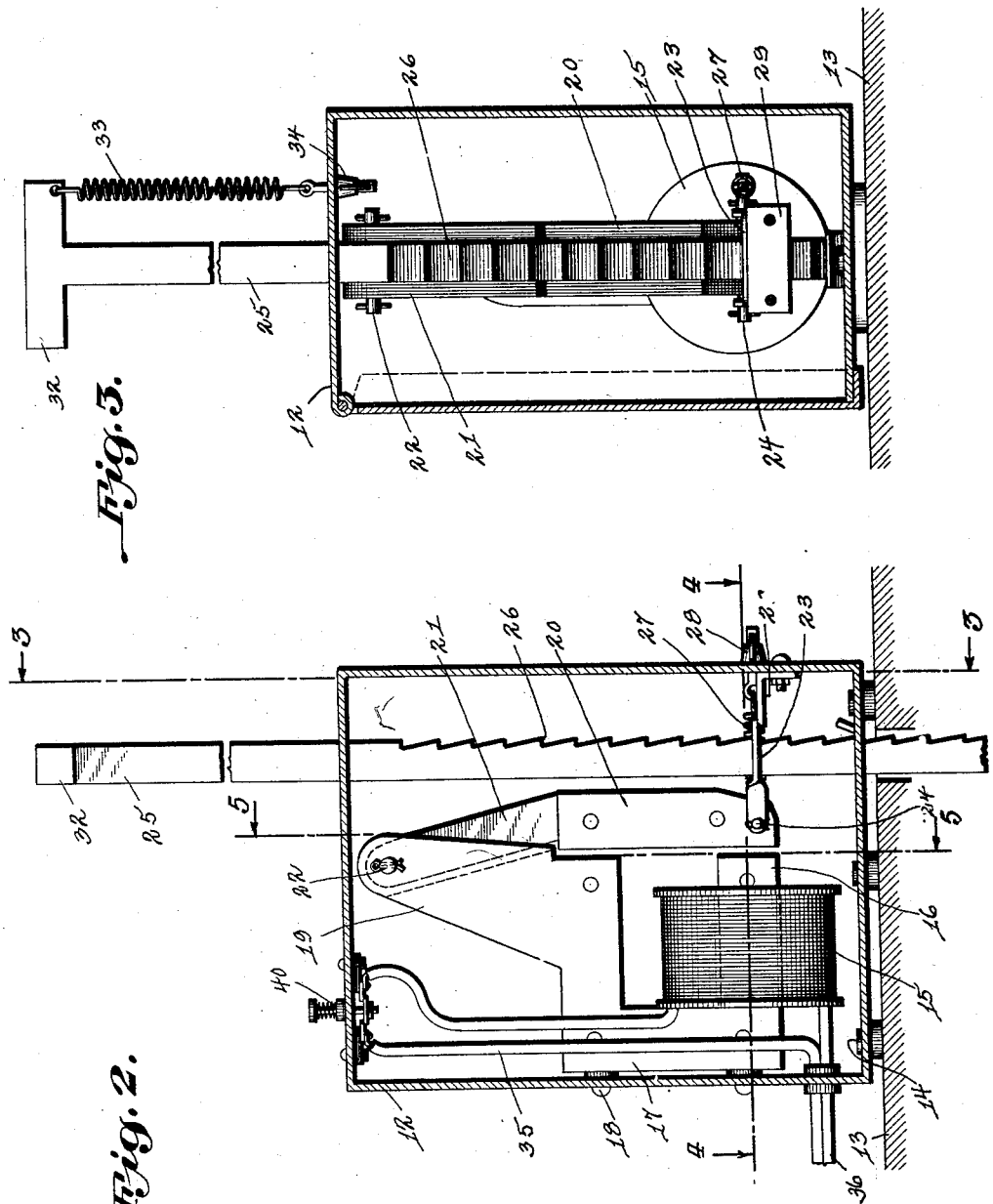

Jan. 26, 1932. H. R. SIMMONS 1,842,919
AUTOMATIC RELEASE ATTACHMENT FOR SLIDING GRAIN CUT-OFF
Filed May 28, 1930 3 Sheets-Sheet 3
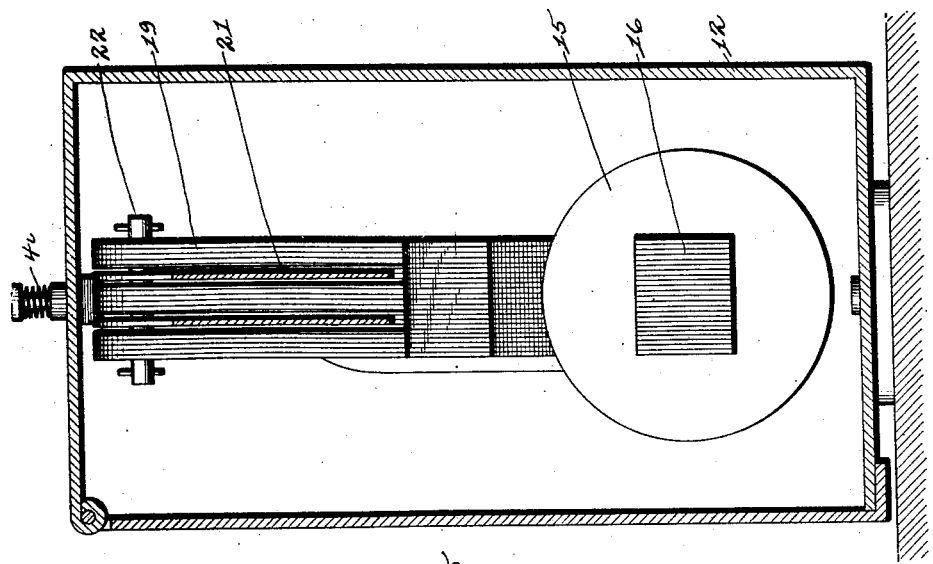

Patented Jan. 26, 1932

1,842,919

UNITED STATES PATENT OFFICE

HAROLD R. SIMMONS, OF PLAINS, KANSAS

AUTOMATIC RELEASE ATTACHMENT FOR SLIDING GRAIN CUT-OFFS

Application filed May 28, 1930. Serial No. 456,749.

My invention relates to an automatic release for a grain cut-off, for use in connection with grain conveyors to automatically shut-off the flow of grain to the conveyor when the motive power of the conveyor stops.

It is an object of the invention to provide means for holding the grain cut-off open, operated by an electro-magnet connected with the circuit of the electric motor operating the conveyor, which upon stopping of the motor will automatically release the grain cut-off, preventing clogging of the conveyor with grain.

A further object of the invention is to provide a device of the above-mentioned character which is simple and durable in construction, reliable and efficient in use and inexpensive to manufacture.

Other objects and advantages of the invention will be apparent during the course of the following description.

In the accompanying drawings, forming a part of this specification and in which like numerals are employed to designate like parts throughout the same, Fig. 1 is a side elevation view, partly in section of a grain conveyor equipped with my device, Fig. 2 is a vertical sectional view of the release device, Fig. 3 is a section taken on lines 3—3 of Fig. 2, Fig. 4 is a horizontal section taken on lines 4—4 of Fig. 2, and, Fig. 5 is a vertical section taken on lines 5—5 of Fig. 2.

In the drawings, wherein for the purpose of illustration, I have shown a preferred embodiment of my invention, the numeral 5 denotes a conventional type of grain lift, consisting of an endless conveyor 6, operated by an electric motor 7, a hopper 8 having a chute 9 for delivering grain to the lower end of the conveyor and a hopper 10 at the upper end of the conveyor to receive the grain discharged therefrom. At the lower end of the chute 9 is a slide valve 11 for cutting off the flow of grain from the hopper 8, when the conveyor is not operating, which at the present time is manually operated. In order to insure the closing of the valve 11, when the electric motor fails to operate, I have provided a mechanism for automatically releasing the slide valve, thereby preventing the clogging of the conveyor.

Referring more particularly to my invention, the numeral 12 denotes a rectangular metal casing connected to the floor 13 by screws 14. Mounted within the casing is an electro-magnet 15, the core 16 of the magnet having an angular extension 17, disposed in parallel relation to the wall of the casing and secured thereto, by screws 18. Offset from the upper end of the extension 17 is an upwardly extending arm 19, from which is suspended the armature 20, by means of the strips 21, pivotally connected to the arm 19 by means of the pin 22. The lower end of the armature is disposed in confronting relation to the core of the magnet and pivotally connected to the lower end of the armature is a U-shaped strap 23, as at 24, which extends at right angles from the armature and embraces the rod 25, extending vertically through the casing. One side of the rod is provided with ratchet teeth 26 and the strap 23 is drawn into gripping engagement with the ratchet teeth by the armature when the latter is attracted by the electro-magnet, but is moved to dis-engaging relation to the teeth, when the magnet releases the armature by the coil spring 27 extending between the armature and wall of the casing, the tension of the spring being adjusted by the nut 28. A bracket 29 attached to the wall of the casing guides the movement of the strap 23. The rod 25 extends below the casing and is connected to the operating rod 30 of the slide valve 11, as at 31, while the upper end of the rod projects above the casing and is provided with a handle 32. A coil spring 33 is disposed between the handle 32 and top of the casing, being connected to the top by the adjusting screw 34, and serves to pull the rod 25 down when released by the strap 23.

The electro-magnet is connected with the electric circuit of the motor 7, by wires 35 and 36, leading from the electro-magnet and having connection with the wires 37 and 38 respectively of the motor circuit, the motor circuit having a switch 39 interposed therein. A push switch 40 is interposed in the wire 35 being mounted on top of the casing, whereby the circuit to the electro-magnet may be opened when ever desired.

In operation, it will be seen that when the circuit of the electric motor is closed, the electro-magnet will be energized, attracting the armature and moving the strap into gripping engagement with the ratchet teeth of the rod 25. Upon raising the rod 25 by the handle 32, the slide valve 11 is opened permitting the grain from the hopper 8 to flow to the conveyor, and is held open by reason of the strap engaging the teeth of the rod. If the current of the motor circuit should fail, the electro-magnet becomes de-energized, releasing the armature which is drawn away from the magnet by the coil spring 27, thereby dis-engaging the strap from the ratchet teeth of the rod 25, allowing the rod to be pulled down by the spring 33, closing the slide valve 11 and cutting off the flow of grain to the conveyor. If at any time, it is desired to cut-off the flow of grain to the conveyor, while the conveyor is still operating, the circuit to the magnet may be opened by actuating the switch 40.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. An automatic release for grain cut-off valves comprising a casing, a rack bar extending vertically through said casing having its lower end connected with the valve, an electro-magnet, an electric circuit for said magnet, means actuated by said magnet for engaging and holding said rack bar in a raised position, and means for pulling said rack bar down when the circuit to said magnet is broken.

2. In an automatic release for grain cut-off valves the combination with a grain conveyor having an electric motor for operating the same, of a casing, a rack bar extending vertically through said casing having its lower end connected with the valve, an electro-magnet having connection with the electric circuit of said electric motor, means actuated by said magnet for engaging and holding said rack bar in a raised position and means for pulling said rack bar down when the circuit to said magnet is broken.

3. In an automatic release for grain cut-off valves, the combination with a grain conveyor having an electric motor for operating the same, of a casing, a slidable rack bar extending vertically through said casing having its lower end connected with the valve, an electro-magnet having connection with the electric circuit of said electric motor, an armature movable towards and from said magnet, a strap connected with said armature and embracing said rack bar, adapted to engage and hold said rack bar in a raised position when the armature is attracted by said magnet, a spring for disengaging said strap when said armature is released by said magnet and a spring for pulling said rack bar down when released.

4. In an automatic release for grain cut-off valves, the combination with a grain conveyor having an electric motor for operating the same, a rack bar mounted for sliding movement having one end connected with the valve, an electro-magnet having connection with the electric circuit of said electric motor, means actuated by said magnet for engaging and holding said rack bar in its adjusted position and means for releasing said first mentioned means when said electro-magnet is deenergized.

5. In an automatic release for grain cut-off valves, the combination with a grain conveyor having an electric motor for operating the same, a rack bar mounted for sliding movement having one end connected with the valve, an electro-magnet having connection with the electric circuit of said motor, means actuated by said magnet for engaging and holding said rack bar in its adjusted position, and means for actuating said rack bar to close the valve when said magnet is de-energized.

6. In an automatic release for grain cut-off valves, the combination with a grain conveyor having an electric motor for operating the same, a rack bar mounted for sliding movement having one end connected with the valve, an electro-magnet having connection with the electric circuit of said motor, means actuated by said magnet for engaging and holding said rack bar in its adjusted position, means for releasing said first mentioned means when said magnet is de-energized, and means for actuating said rack bar to close the valve when the same is released.

7. In an automatic release for grain cut-off valves, the combination with a grain conveyor having an electric motor for operating the same, a slidably mounted bar for opening and closing the valve, an electro-magnet having connection with the electric circuit of said motor, a catch actuated by said magnet adapted to engage and hold said bar in its adjusted position, and means for releasing said catch when said magnet is de-energized.

In testimony whereof I affix my signature.
H. R. SIMMONS.